(12) United States Patent
Jeon

(10) Patent No.: US 12,254,169 B2
(45) Date of Patent: Mar. 18, 2025

(54) METHOD AND APPARATUS FOR DRAWING BOUNDING BOX FOR DATA LABELING

(71) Applicant: SELECT STAR, INC., Daejeon (KR)

(72) Inventor: Mun Hwi Jeon, Seoul (KR)

(73) Assignee: SELECT STAR, INC., Daejeon (KR)

( * ) Notice: Subject to any disclaimer, the term of this patent is extended or adjusted under 35 U.S.C. 154(b) by 0 days.

(21) Appl. No.: 17/771,171

(22) PCT Filed: Dec. 2, 2020

(86) PCT No.: PCT/KR2020/017438
§ 371 (c)(1),
(2) Date: Apr. 22, 2022

(87) PCT Pub. No.: WO2021/101357
PCT Pub. Date: May 27, 2021

(65) Prior Publication Data
US 2022/0391075 A1 Dec. 8, 2022

(30) Foreign Application Priority Data
Nov. 18, 2019 (KR) .......... 10-2019-0147563

(51) Int. Cl.
*G06F 3/048* (2013.01)
*G06F 3/0481* (2022.01)
*G06F 3/04845* (2022.01)
*G06F 3/04883* (2022.01)
*G06F 9/451* (2018.01)

(52) U.S. Cl.
CPC ........ *G06F 3/04845* (2013.01); *G06F 3/0481* (2013.01); *G06F 3/04883* (2013.01); *G06F 9/451* (2018.02); *G06F 2203/04806* (2013.01)

(58) Field of Classification Search
CPC .............. G06F 3/04845; G06F 3/0481; G06F 3/04883; G06F 9/451; G06F 2203/04806
See application file for complete search history.

(56) References Cited

U.S. PATENT DOCUMENTS

| | | | |
|---|---|---|---|
| 8,225,225 B2* | 7/2012 | Jetha ................ | G06F 3/04842 715/769 |
| 9,075,933 B2* | 7/2015 | Stone .................. | G06F 30/00 |
| 10,546,209 B2* | 1/2020 | Lee ..................... | G06V 10/764 |
| 11,061,406 B2* | 7/2021 | Mao ................ | B60W 30/0956 |

(Continued)

FOREIGN PATENT DOCUMENTS

| | | |
|---|---|---|
| JP | 2018-196046 | 12/2018 |
| KR | 1020080078752 | 8/2008 |

(Continued)

OTHER PUBLICATIONS

Office Action for Korea Patent Application No. 10-2019-0147563, dated Jul. 8, 2020.

(Continued)

*Primary Examiner* — Mahelet Shiberou

(57) ABSTRACT

The present embodiment relates to a method and apparatus for performing a box drawing task for data labeling, which provide a user interface for an interaction with a user to perform a data labeling-associated task corresponding to drawing of a box on an object in a photo and, on the basis of same, allow high-quality training data to be secured.

8 Claims, 12 Drawing Sheets

(56) References Cited

U.S. PATENT DOCUMENTS

| | | | |
|---|---|---|---|
| 2013/0031082 A1* | 1/2013 | Wolfram | G06F 16/3329 |
| | | | 707/706 |
| 2018/0137892 A1* | 5/2018 | Ding | G11B 27/031 |
| 2020/0014961 A1* | 1/2020 | Ramaswamy | G06F 3/04842 |
| 2020/0098154 A1* | 3/2020 | Marinier | G06F 3/0486 |
| 2020/0151944 A1* | 5/2020 | Jain | G06F 7/764 |
| 2021/0271809 A1* | 9/2021 | Huang | G06F 40/216 |

FOREIGN PATENT DOCUMENTS

| | | |
|---|---|---|
| KR | 102030754 | 9/2013 |
| KR | 1020160045714 | 4/2016 |
| KR | 1020190124559 | 11/2019 |

OTHER PUBLICATIONS

PCT International Search Report and Written Opinion for International Application No. PCT/KR2020/017438, date of mailing Mar. 4, 2021.

\* cited by examiner

METHOD AND APPARATUS FOR DRAWING BOUNDING BOX FOR DATA LABELING

TECHNICAL FIELD

The present embodiment relates to a method and an apparatus for drawing a bounding box for data labeling. More particularly, the present embodiment relates to a method and an apparatus for securing high-quality training data by performing a box drawing task for data labeling.

BACKGROUND ART

The description in this section merely provides background information for the present embodiment, and does not constitute the related art.

In machine learning, data for training is more important than training methods and algorithms. Therefore, it is very important to secure much high-quality training data in the field of machine learning.

In order to obtain the training data, in general, raw data and labeling information for the raw data are required. Since a labeling task has to be performed by a person, a place that researches or develops the machine learning may have manpower for performing the labeling task.

However, since labeling is often performed by anyone without expertise, in order to reduce a labor cost, a platform for distributing data to a large number of operators through the Internet and paying remuneration for the labeling task has emerged. For example, there is Mechanical Turk of Amazon.

However, in a case of an existing platform, there is no process of inspecting whether an operator has performed labeling with sincerity, so there is a problem that reliability of training data may not be guaranteed. Therefore, there is a demand for development of a technology capable of increasing the reliability of the training data while maintaining advantages of the existing platform.

DISCLOSURE

Technical Problem

An object of the present embodiment is to provide a user interface for an interaction with a user to perform a data labeling-associated task corresponding to drawing of a box on an object in a photograph, and allow high-quality training data to be secured based on the provision.

Technical Solution

The present embodiment provides a data labeling apparatus including: a display unit for displaying a user interface; and a control unit for performing a control to display the user interface for an interaction with a user on the display unit to perform a data labeling-associated task corresponding to drawing of a box on an object in a photograph.

In addition, another aspect of the present embodiment provides a data labeling method including: displaying a user interface for an interaction with a user on a display unit to perform a data labeling-associated task corresponding to drawing of a box on an object in a photograph; receiving a user input; and performing a control to perform the task to generate a bounding box surrounding a task performance target based on the user input and the user interface.

Advantageous Effects

According to the present embodiment, a user interface for an interaction with a user can be provided to perform a data labeling-associated task corresponding to drawing of a box on an object in a photograph, and high-quality training data can be secured based on the provision.

MODE FOR INVENTION

Hereinafter, some embodiments of the present invention will be described in detail with reference to exemplary drawings.

Figure 1:
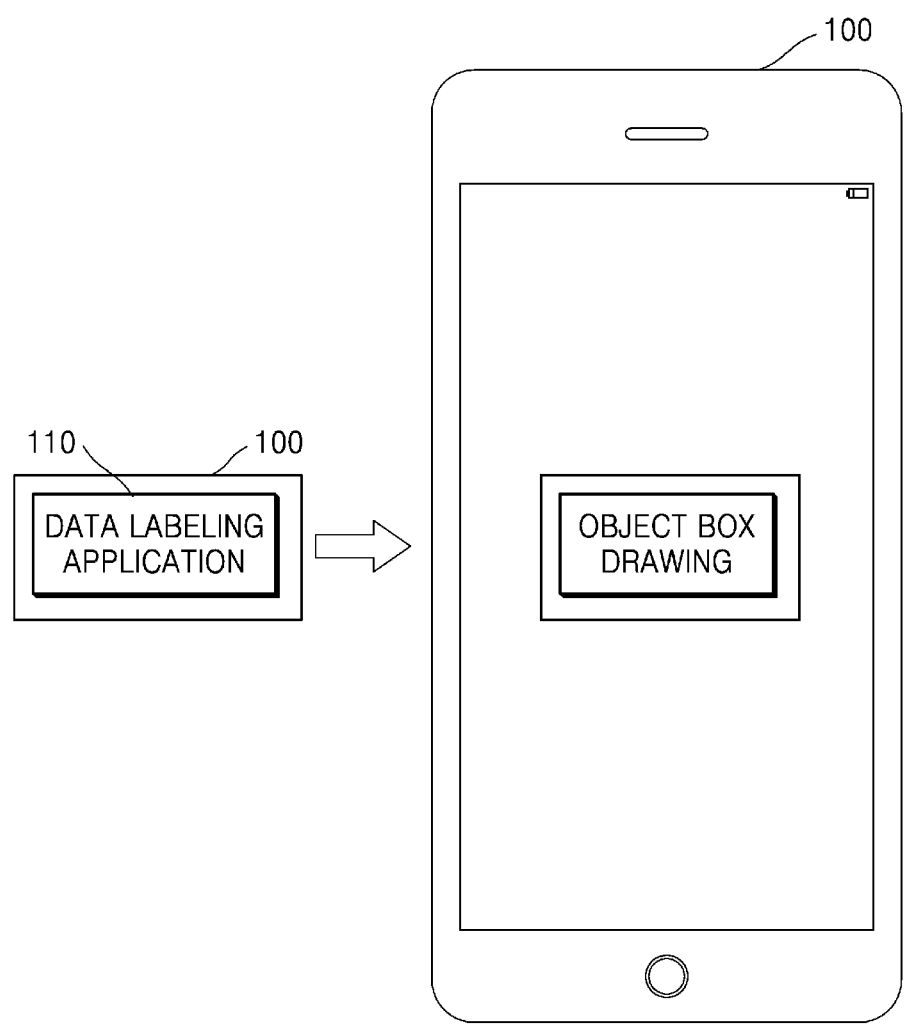
FIG. 1 is a block diagram schematically showing a terminal equipped with a data labeling application according to the present embodiment.

FIG. 1 is a block diagram schematically showing a terminal equipped with a data labeling application according to the present embodiment.

A terminal 100 may refer to a terminal capable of transmitting and receiving various data by using a communication intermediary device including an AP according to a key manipulation of a user, and may be one of a tablet PC, a laptop, a personal computer (PC), a smart phone, a personal digital assistant (PDA), a mobile communication terminal, and the like. In other words, the terminal 100 may be a terminal for performing voice or data communication by using an AP and a communication network, and may refer to a terminal including a memory for storing a program or a protocol for communicating with an external device via an AP and a communication network, a microprocessor for executing the program to perform calculation and control, and the like.

According to the present embodiment, the terminal 100 may be equipped with a data labeling application 110 to provide a function of performing a data labeling-associated task. The terminal 100 may drive the data labeling application 110 by a manipulation or a command of a user, and may provide a function of performing a data labeling-associated task through the data labeling application 110.

Meanwhile, with regard to a form in which the terminal 100 according to the present embodiment is equipped with the data labeling application 110, the terminal 100 may be implemented such that the data labeling application 110 is embedded in the terminal 100, the data labeling application 110 is embedded in an operating system (OS) equipped in the terminal 100, or the data labeling application 110 is installed in the OS in the terminal 100 by a manipulation or a command of the user. According to another embodiment, the terminal 100 may access the data labeling application 110 through connection to a web.

Hereinafter, an operation in which the terminal 100 provides the function of performing the data labeling-associated task will be described. The terminal 100 may provide an item for selecting an object box drawing task when the data labeling application 110 equipped in the terminal 100 is executed.

The terminal 100 may operate to perform the object box drawing task according to the selected item. For example, when the item is selected, the terminal 100 may operate to additionally output a screen for selecting a task performance target, or directly output a preset task performance target onto a screen.

Figure 3:
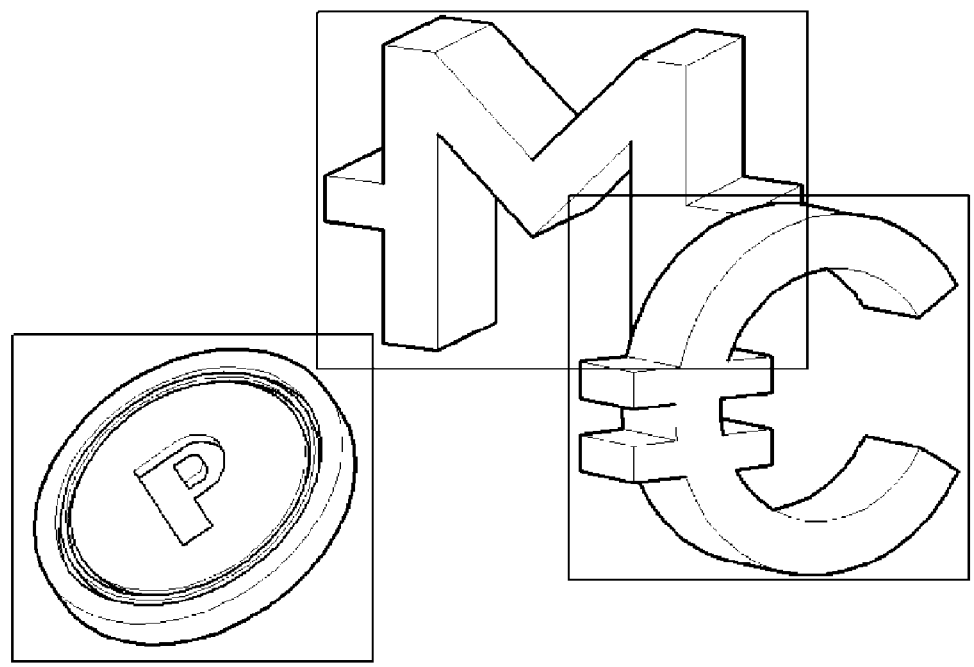
FIG. 3 is a view illustrating a data labeling-associated task according to the present embodiment.

FIG. 3 is a view illustrating a data labeling-associated task according to the present embodiment.

As shown in FIG. 3, the data labeling-associated task according to the present embodiment may be a task of drawing a rectangular box such that the rectangular box perfectly fits an object in a photograph. In other words, the data labeling-associated task according to the present embodiment may correspond to a process of calculating a bounding box corresponding to a boundary of the object through complete separation of a background and the object, and labeling the object in an image based on the calculation.

According to the present embodiment, a performance result according to the task may then be utilized as essential training data in order for an AI to recognize a specific object in a specific photograph when learning the photograph.

According to the present embodiment, the terminal 100 may operate to provide a user interface for an interaction with the user to perform the data labeling-associated task, and provide high-quality training data based on the provision. Meanwhile, according to the present embodiment, a detailed description of the user interface for performing the data labeling-associated task will be described below with reference to FIG. 2.

Figure 2:
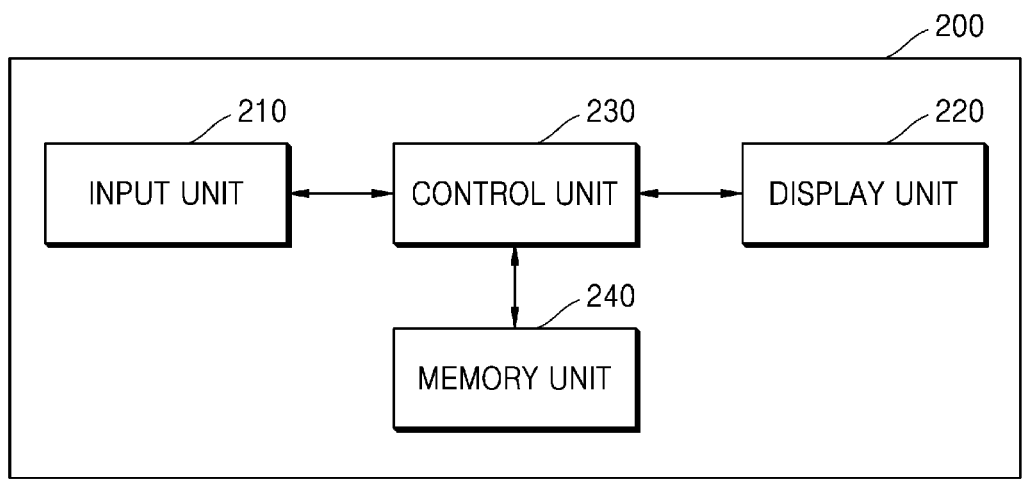
FIG. 2 is a block diagram schematically showing a data labeling apparatus according to the present embodiment.

FIG. 2 is a block diagram schematically showing a data labeling apparatus according to the present embodiment. Although such a data labeling apparatus 200 substantially shows a view of an internal configuration of the terminal 100 equipped with the data labeling application 110, the terminal 100 equipped with the data labeling application 110 may be implemented as the data labeling apparatus 200 that is a separate device, and components included in the data labeling apparatus 200 may be implemented as software or hardware elements, respectively. In other words, the data labeling apparatus 200 shown in FIG. 2 is an embodiment in which the data labeling application 110 is implemented as a separate device, and the data labeling apparatus 200 according to the present embodiment may include an input unit 210, a display unit 220, a control unit 230, and a memory unit 240. In this case, the components included in the data labeling apparatus 200 are not necessarily limited to the above components.

The input unit 210 may receive user input information on the performance of the data labeling-associated task through the user interface. In other words, the input unit 210 may receive user touch information, user selection information, and the like through the user interface.

Meanwhile, the input unit 210 may be implemented as various input devices according to a configuration, a function, and the like of the data labeling apparatus 200. For example, when the data labeling apparatus 200 is a smart phone or a tablet PC, the input unit 210 may be implemented through an input device such as a touch screen, a keypad, or a voice recognition sensor, and when the data labeling apparatus 200 is a personal computer, the input unit 210 may be implemented through an input device such as a mouse or a keyboard. In particular, in a case of a smart phone to which a touch screen is applied, the input unit 210 and the display unit 220 may be replaced with the touch screen. The input unit 210 may transmit a selection command received from the user to the control unit 230.

Meanwhile, the 'selection command' of the user for a GUI element may be an event such as 'click', 'drag', or 'mouse over' for the GUI element when the input unit 210 is implemented as a mouse, and may be an event such as 'tapping', 'drag', 'flicking', or 'press' when the input unit 210 is implemented as a touch sensor of a touch screen.

In this case, the mouse over event may refer to an operation of locating a mouse cursor on a specific object for a predetermined time. The tapping event may refer to an operation of lightly pressing and releasing a selected object (such as a number, a letter, a symbol, or an icon) once, which is a touch input that is similar to a click of a mouse in a general PC. The drag event may refer to an operation of moving a specific object to a specific location while selecting and pressing (touching) the specific object and releasing the specific object, in which the object moved while being pressed may be continuously moved in a movement direction and fixed in the releasing operation. The flicking event may refer to an operation of performing a touch, moving in one direction among specific directions (upward, downward, left, right, or diagonal), and releasing a contact point, in which a specific operation may be processed according to an operation direction and a movement speed of the flicking event. For example, the flicking event may refer to an event for an operation that is similar to turning-over of a page. The press event may refer to an event for an operation of performing a touch and continuously pressing a contact point, and a release event may refer to an event for an operation of performing a touch and releasing a contact point.

The display unit 220 may perform a function of outputting results according to operations of the input unit 210 and the control unit 230 through a display device.

According to the present embodiment, the display unit 220 may display the user interface for the interaction with the user to perform the data labeling-associated task.

According to the present embodiment, the user interface may include at least one region for the performance of the task. Hereinafter, according to the present embodiment, the user interface will be described as largely including first and second regions for illustrative purposes, but the embodiments are not necessarily limited thereto.

Such a user interface may be displayed on the display unit 220 by the control unit 230 based on a program stored in the memory unit 240.

The first region may refer to a task space for performing the data labeling-associated task, which is a region for displaying task information including a task performance target, and a task performance process and a task performance result for the task performance target.

The second region may refer to a region for displaying a function module associated with the performance of the task. For example, according to the present embodiment, the second region may display a first function module for switching a current state of the task performance target to a full view state, a second function module for converting a color state associated with the task performance target, a third function module for submitting the task performance result, and the like. In addition, the second region may additionally include a fourth function module for switching to a task success for the task performance target or a next task performance target regardless of the task success, and the like.

According to the present embodiment, the data labeling apparatus 200 may provide a task space and various functions for a data labeling task by using the user interface of the display unit 220, and allow high-quality training data to be collected more efficiently based on the provision. Meanwhile, details of the data labeling task by using the user interface according to the present embodiment will be described below in a process of describing the operation of the control unit 230.

The control unit 230 may perform a control to display the user interface for the interaction with the user on the display unit 220 to perform the data labeling-associated task corresponding to drawing of a box on an object in a photograph. In other words, the control unit 230 may interwork with the input unit 210 and the display unit 220 to perform an overall control function for performing the data labeling-associated task.

Hereinafter, a method of performing, by the control unit 230, the data labeling-associated task by using the user interface of the display unit 220 according to the present embodiment will be described with reference to FIGS. 4 to 11. Meanwhile, in the following description, a task of drawing a box on an object in a photograph among data labeling-associated tasks will be described for illustrative purposes.

Figure 4:
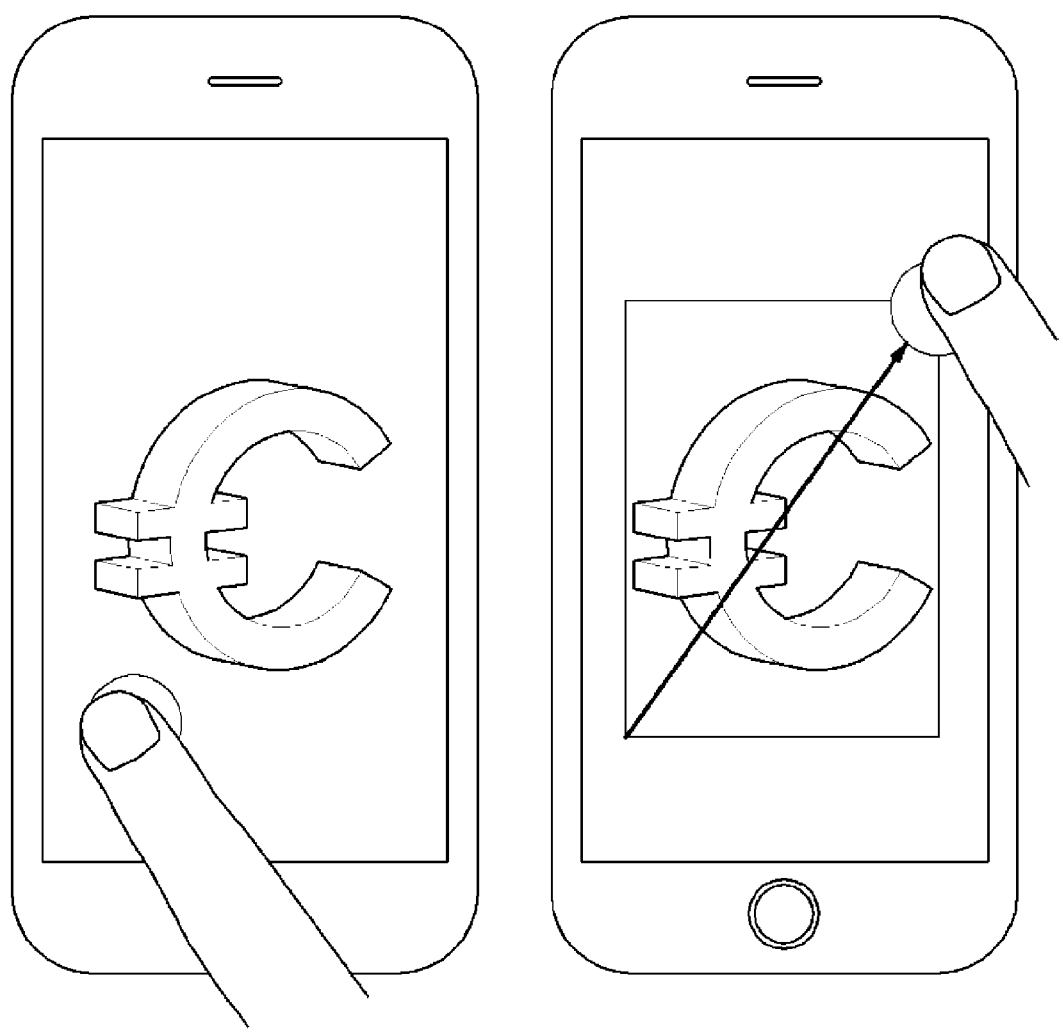
FIGS. 4 to 11 are views for describing a data labeling method using a user interface according to the present embodiment.

As shown in FIG. 4, according to the present embodiment, the control unit 230 may perform a control to generate a bounding box corresponding to the task performance target when user touch information (e.g., drag input information) for the task performance target displayed in the first region is input.

The control unit 230 may perform a control to perform the task of drawing the box to generate the bounding box surrounding the task performance target by matching an outer peripheral line of each side of the bounding box and an outermost peripheral line of each side of the task performance target based on user adjustment information corresponding to the generated bounding box.

Figure 5:
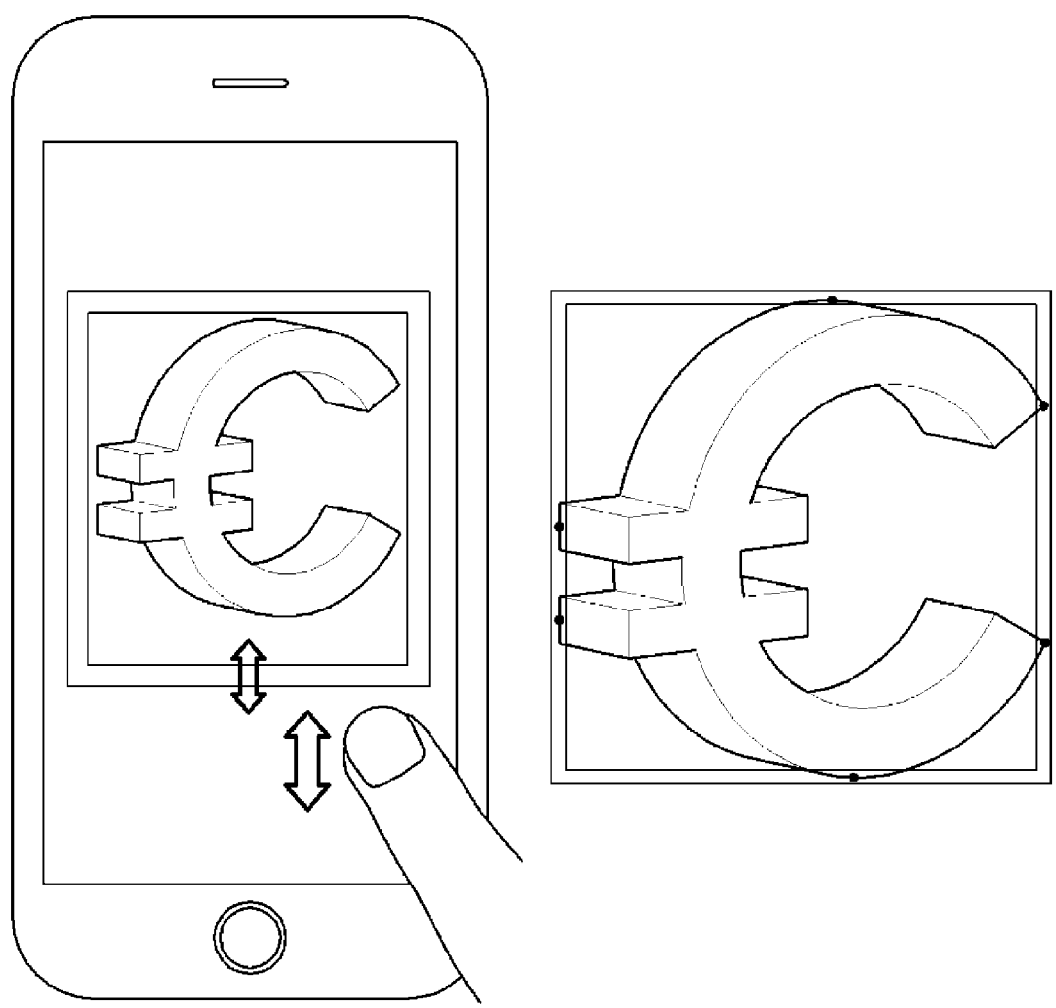

For example, referring to FIG. 5, according to the present embodiment, the control unit 230 may generate the bounding box including an in-box and an out-box, and thus may perform a control to perform the task of drawing the box by allowing the user to adjust each box line so that an edge of the object is interposed between two box lines.

Meanwhile, the control unit 230 may perform a control such that a line adjustment may be performed even when a periphery of the outer peripheral line of the bounding box is selected. This has an advantage that the task may be performed much more comfortably than a case with an existing task tool because the box line may be adjusted even by touching an outer peripheral surface portion of the box line, as compared with an existing case in which a box line is clicked so as to be adjusted while controlling the box line. In more detail, the control unit 230 may perform a control to divide a screen outside the box into four zones (e.g., top, bottom, left, right) based on the box, and move a box line corresponding to each zone when the zone is touched.

In a case of the present embodiment, the control unit 230 may determine that the performance of the task is completed when the bounding box having a shape in which the outermost peripheral line of each side of the task performance target is located between outer peripheral lines corresponding to the in-box and the out-box, respectively, is recognized.

Meanwhile, the most important point in bounding box labeling is that the labeling has to be performed as tight as possible to match a boundary line of the object so as to be the greatest assistance for AI training. However, since persons have mutually different tightness criteria, in the case of the present embodiment, the in-box and the out-box are used to obtain a consistent labeling result. In other words, in order to determine the completion of the performance of the task, a tightness criterion required for the labeling defined by a person who placed an order for the labeling, that is, a relation between the in-box and the out-box may be established as a formula so that calculation may be automatically performed. Since no final bounding box has to be located inward of the boundary line of the object, a final labeling result will use the out-box.

As a result, an operator may focus only on putting the boundary line of the object between the in-box and the out-box with a predetermined ratio without being based on a subjective criterion for a tightness degree of the box, so that any operator may achieve the consistent labeling result.

Figure 6:
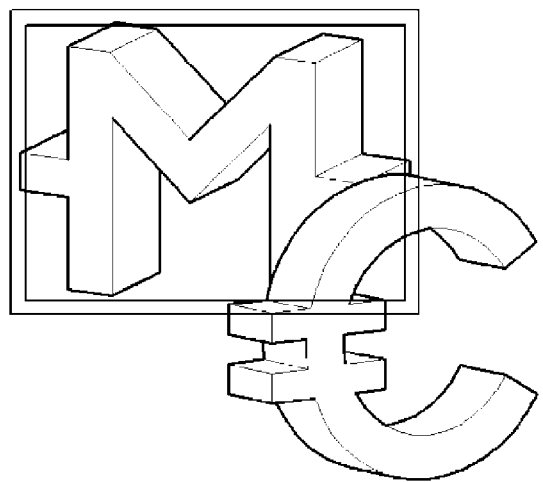

Meanwhile, as shown in FIG. 6, when the object is covered while performing the task, the box may be generated to include only the object that is visible. In this case, the control unit 230 may also determine that the performance of the task is completed.

The control unit 230 may perform a control to perform the task as described above with respect to all task performance targets shown on the first region, and may determine whether the performance of the task is completed.

Figure 7:
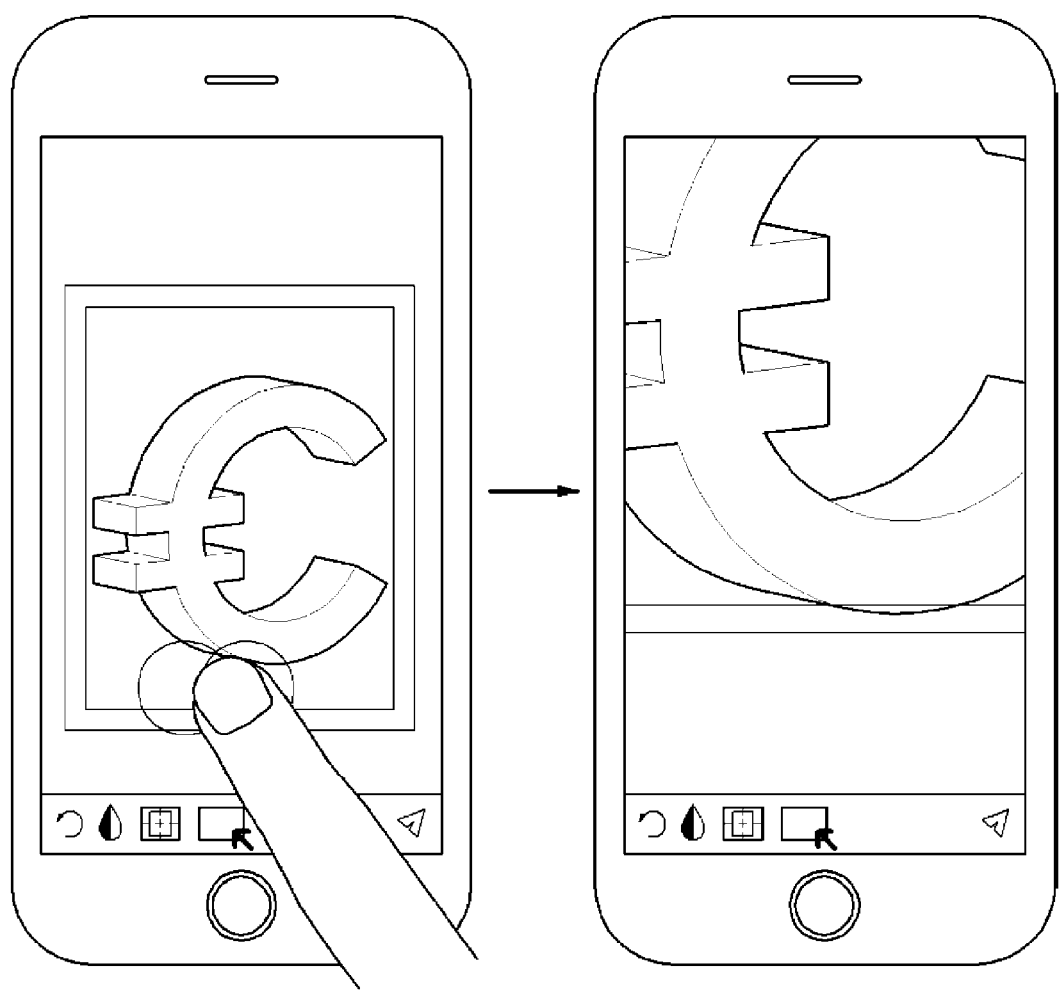

As shown in FIG. 7, the control unit 230 may perform a control to enlarge the task performance target when user click information or a user swipe operation for the first region is recognized in a process of performing the task. For example, the control unit 230 may enable a more accurate task to be performed with respect to the performance of the task by enlarging the task performance target.

Figure 8:
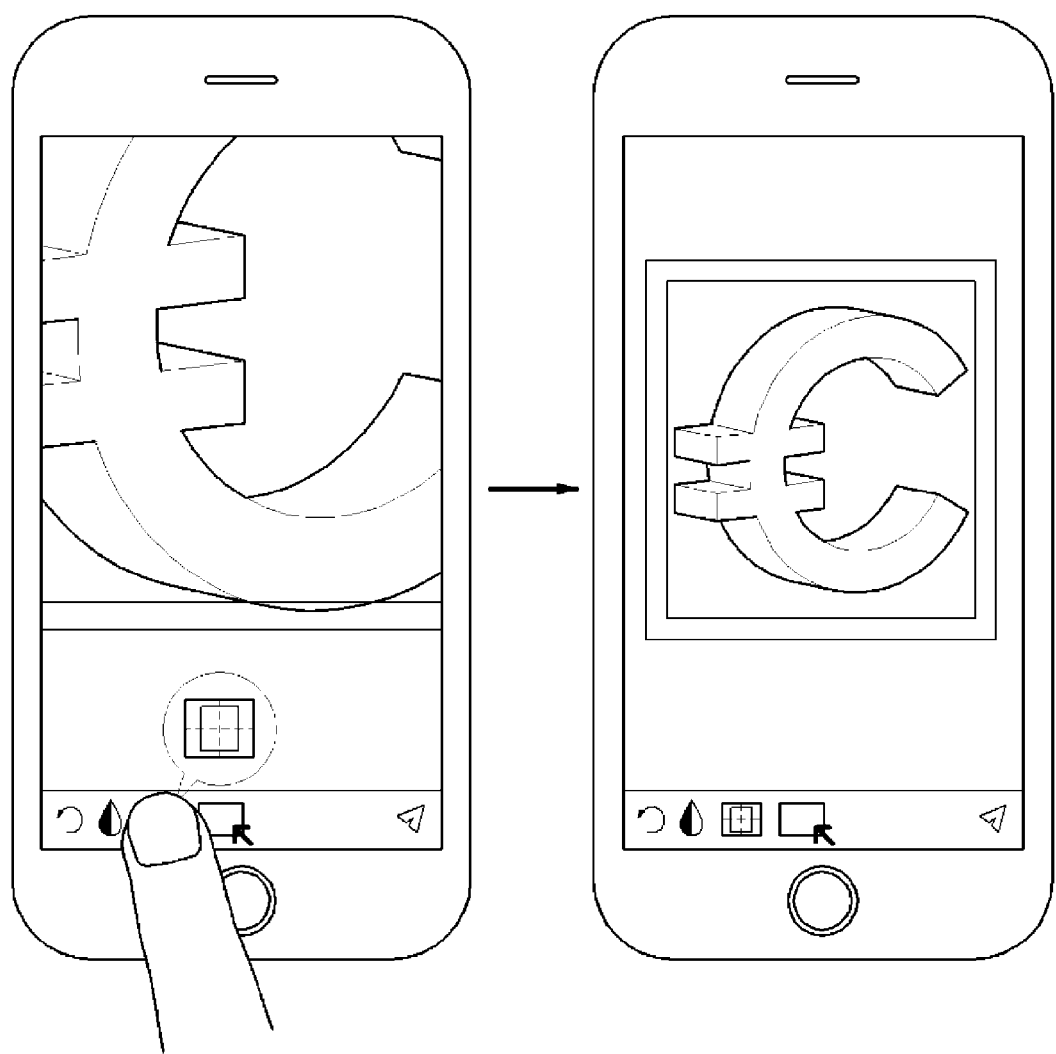

As shown in FIG. 8, the control unit 230 may perform a control to switch a screen from an enlarged state to a full box view state when button click information for a full view button (e.g., the first function module) is recognized while the task performance target is enlarged.

Figure 9:
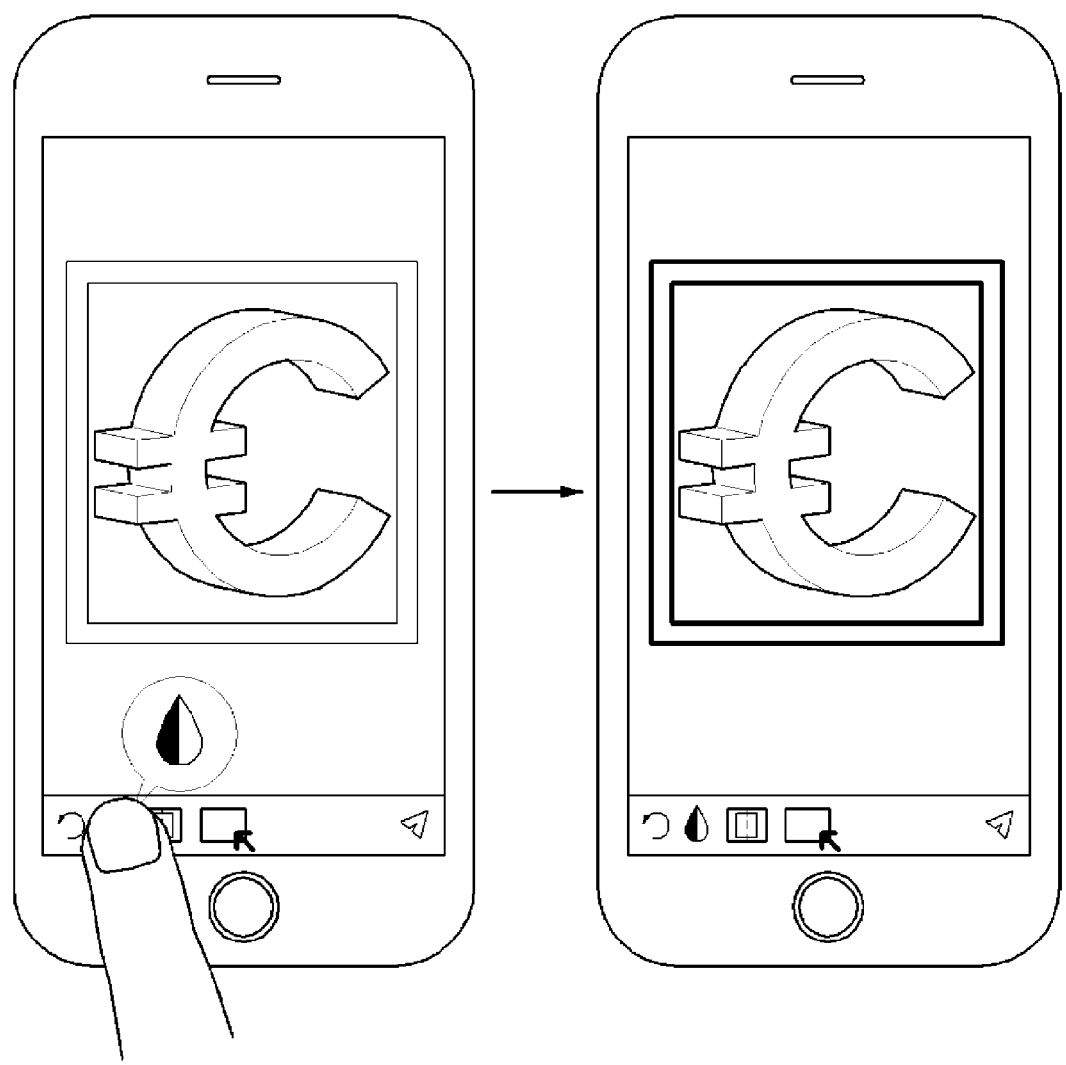

As shown in FIG. 9, the control unit 230 may perform a control to convert a color of the outer peripheral line of the bounding box when button click information for a paint button (e.g., the second function module) is recognized while performing the task.

Figure 10:
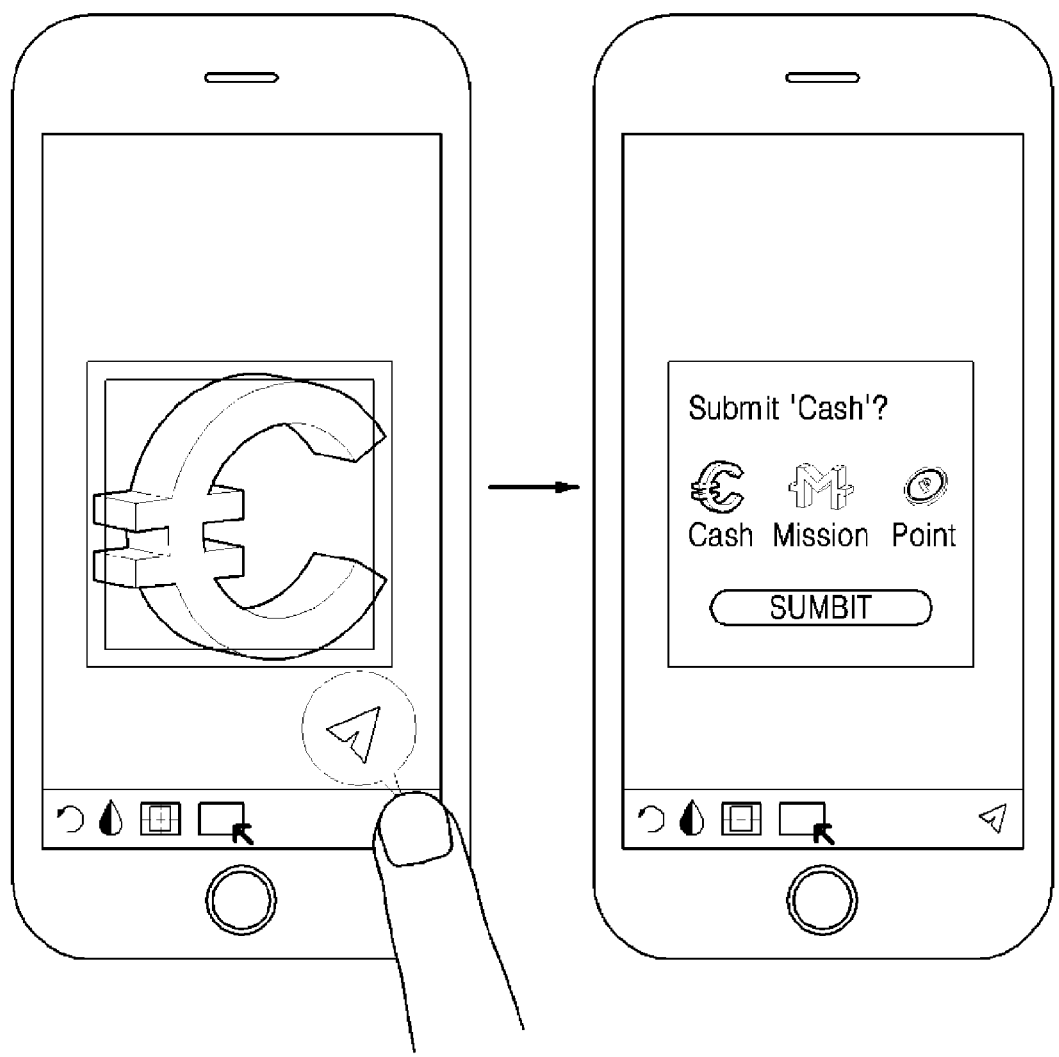

As shown in FIG. 10, the control unit 230 may perform a control to submit the task performance result when button click information for an airplane button (e.g., the third function module) in the function module is recognized while the performance of the task of drawing the box is completed through the adjustment of the bounding box.

Meanwhile, according to the present embodiment, the control unit 230 may perform a control to provide a screen for selecting or inputting correct answer information corresponding to the task performance target, and provide the selected or input correct answer information together with an object photograph on which the box is generated as the task performance result based on the provision, when the button click information for the airplane button is recognized.

Figure 11:
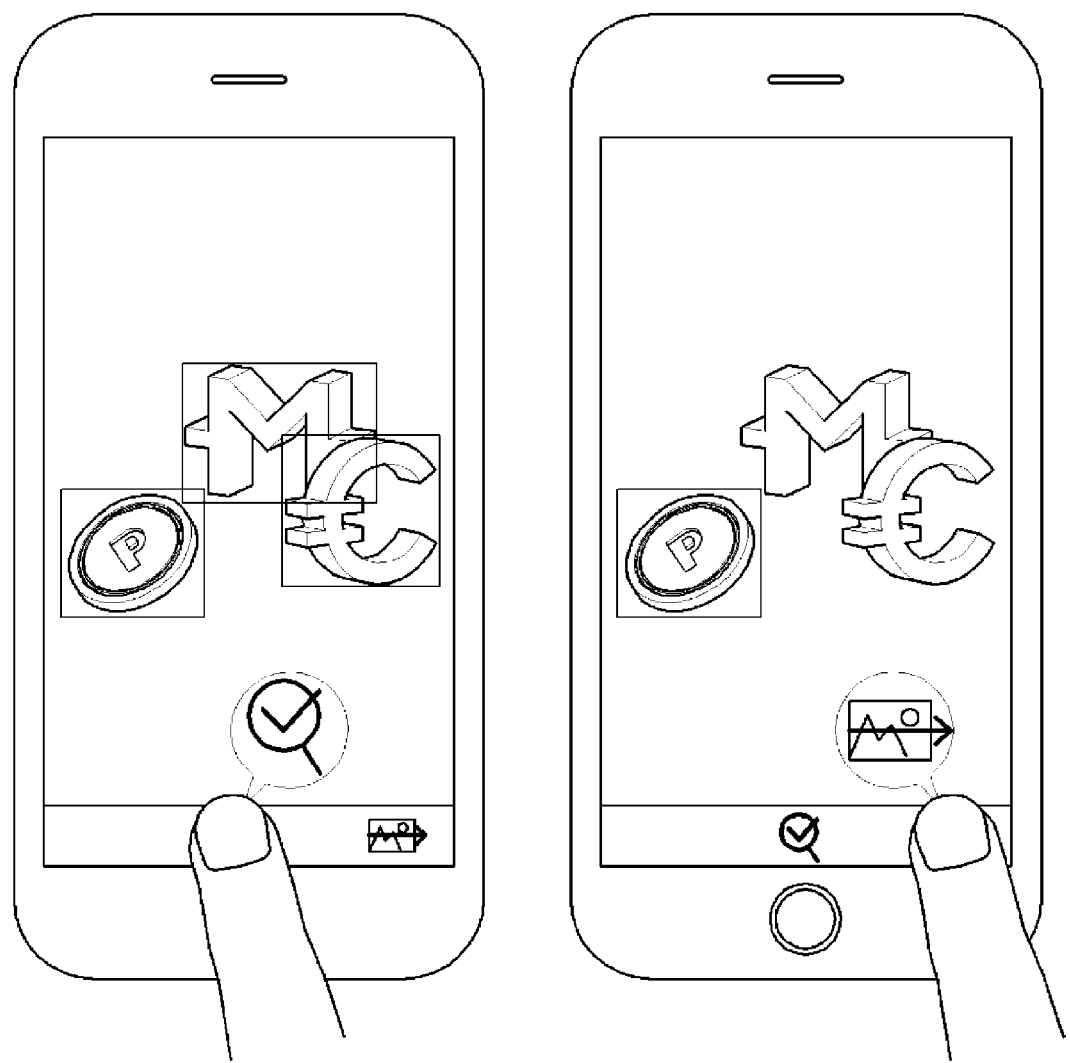

As shown in FIG. 11, the control unit 230 may perform a control to switch to a next task performance target regardless of a task success state for the task performance target when a skip button (e.g., the fourth function module) in the function module is touched.

In addition, the control unit 230 may perform a control to switch to the next task performance target when a clear button (e.g., the fourth function module) in the function module is touched after the task is completed. In this case, the completion of the task may correspond to a case in which the drawing of the box is completed for all objects in the photograph.

The memory unit 240 may store various data associated with the performance of the data labeling task. For example, the memory unit 240 may include a program for performing a function corresponding to a user input when performing the data labeling task, and the like.

Figure 12:
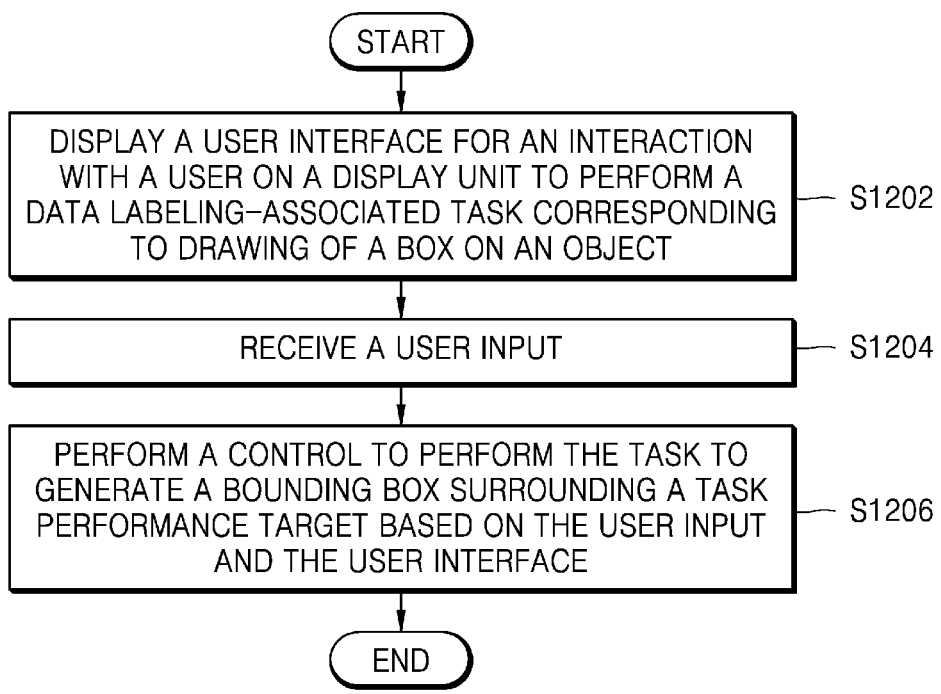
FIG. 12 is a flowchart for describing the data labeling method according to the present embodiment.

FIG. 12 is a flowchart for describing the data labeling method according to the present embodiment.

A data labeling apparatus 200 may display a user interface for an interaction with a user on a display unit 220 to perform a data labeling-associated task corresponding to drawing of a box on an object in a photograph (S1202). In the step S1202, the data labeling apparatus 200 may display the user interface including a first region, which is a task space for performing a data labeling-associated task, and a second region, which is a region where a function module associated with the performance of the task is displayed, on the display unit 220.

The data labeling apparatus 200 may receive user input information on the performance of the data labeling-associated task through the user interface (S1204).

The data labeling apparatus 200 may perform a control to perform the task to generate a bounding box surrounding a task performance target based on the user input information of the step S1204 and the user interface of the step S1202 (S1206).

In this case, since the steps S1202 to S1206 correspond to the operations of the components of the data labeling apparatus 200 described above, further detailed descriptions thereof will be omitted.

Although processes have been described as being sequentially executed with reference to FIG. 12, the embodiments are not necessarily limited thereto. In other words, since changing and executing the processes described in FIG. 12 or executing one or more processes described in FIG. 12 in parallel may be applicable, the processes shown in FIG. 12 are not limited to a chronological order.

Meanwhile, a data labeling method shown in FIG. 12 may be implemented as a program, and recorded in a recording medium (a CD-ROM, a RAM, a ROM, a memory card, a hard disk, a magneto-optical disc, a storage device, etc.) that is readable by using software of a computer.

As described above, the technical idea of the present embodiment has been described merely for illustrative purposes, and various changes and modifications may be made by those of ordinary skill in the art to which the present embodiment pertains without departing from the essential characteristics of the present embodiment. Therefore, the present embodiments are intended to provide descriptions rather than limit the technical idea of the present embodiment, and the scope of the technical idea of the present embodiment is not limited by the embodiments. The scope of the present embodiment should be interpreted by the appended claims, and the scope of the present embodiment should be interpreted as encompassing all technical ideas within the scope equivalent thereof.

DESCRIPTION OF REFERENCE NUMERALS

100: Terminal
110: Data labeling application
200: Data labeling apparatus 210: Input unit
220: Display unit 230: Control unit
240: Memory unit

CROSS-REFERENCE TO RELATED APPLICATION

This patent application claims priority under 35 U.S.C § 119(a) to Korean Patent Application No. 10-2019-0147563 filed on Nov. 18, 2019 in Korea, the entire disclosure of which is incorporated herein by reference. In addition, this patent application claims priority for countries other than the United States for the same reasons as set forth above, the entire disclosure of which is incorporated herein by reference.

The invention claimed is:

1. A data labeling apparatus to reduce a rate of data labeling errors for machine learning, said data labeling apparatus comprising:
   a displayer configured to display a user interface; and
   a controller configured to display the user interface for an interaction with a user on the displayer for annotation with bounding boxes on one object of interest in a photograph, said controller generating a pair of the bounding boxes around the one object of interest,
   wherein the pair of the bounding boxes share a common center, each of which has a different size, which is adjustable in size, and are separated by a fixed interval in which the size of each bounding box increases or decreases simultaneously at a same rate while remaining at the fixed interval regardless of size changes; and
   wherein the controller leads the user to move box lines on each side of the pair of the bounding boxes to capture one or more outermost edges of each side of the one object within the fixed interval between the box lines on each corresponding side of the pair of the bounding boxes, allowing AI-based machine learning models to recognize only the one object of interest within the photograph.

2. The data labeling apparatus of claim 1, wherein the controller performs a control to:
   display task information including a performance target of the data labeling-associated task, and a task performance process and a task performance result for the task performance target on a first region of the user interface; and display at least one function module associated with the performance of the task on a second region of the user interface.

3. The data labeling apparatus of claim 2, wherein the controller is configured to generate the bounding boxes corresponding to the task performance target when a drag input for the task performance target displayed in the first region is input.

4. The data labeling apparatus of claim 2, wherein the controller is configured to enlarge the task performance target when user click information or a user swipe operation for the first region is recognized.

5. The data labeling apparatus of claim 2, wherein the controller is configured to display, on the second region, at least one function module among:
   a first function module for switching a current state of the task performance target to a full view state;
   a second function module for converting a color state associated with the task performance target; and
   a third function module for submitting the task performance result.

6. The data labeling apparatus of claim 5, wherein the controller is further configured to additionally display, on the second region, a fourth function module for switching to a task success state or a next task performance target regardless of the task success state.

7. The data labeling apparatus of claim 5, wherein the controller is further configured to provide a screen for selecting or inputting correct answer information corresponding to the task performance target, and provide the selected or input correct answer information together as the task performance result, when a user selection for the third function module is recognized.

8. A data labeling method comprising:
   displaying a user interface for an interaction with a user on a displayer for annotation with bounding boxes on one object of interest in a photograph;
   receiving a user input;
   generating a pair of the bounding boxes around the one object based on the user input and the user interface, wherein the pair of the bounding boxes share a common center, each of which has a different size, which is adjustable in size, and are separated by a fixed interval in which the size of each bounding box increases or decreases simultaneously at a same rate while remaining at the fixed interval regardless of size changes; and
   allowing the user to move box lines on each side of the pair of the bounding boxes to capture one or more outermost edges of each side of the object within the fixed interval between the box lines on each corresponding side of the bounding boxes, allowing AI-based machine learning models to recognize only the one object of interest within the photograph.

* * * * *